(12) United States Patent
Soroushian et al.

(10) Patent No.: US 10,141,024 B2
(45) Date of Patent: Nov. 27, 2018

(54) HIERARCHICAL AND REDUCED INDEX STRUCTURES FOR MULTIMEDIA FILES

(71) Applicant: DIVX, LLC, San Diego, CA (US)

(72) Inventors: Kourosh Soroushian, San Diego, CA (US); Roland Osborne, San Francisco, CA (US); Jason Braness, San Diego, CA (US); Shaiwal Priyadarshi, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

(21) Appl. No.: 15/229,030

(22) Filed: Aug. 4, 2016

(65) Prior Publication Data

US 2017/0004862 A1 Jan. 5, 2017

Related U.S. Application Data

(63) Continuation of application No. 13/560,884, filed on Jul. 27, 2012, which is a continuation of application No. 12/272,631, filed on Nov. 17, 2008, now Pat. No. 8,233,768.

(60) Provisional application No. 60/988,513, filed on Nov. 16, 2007.

(51) Int. Cl.
*H04N 9/80* (2006.01)
*G11B 27/10* (2006.01)
*G06F 17/30* (2006.01)

(52) U.S. Cl.
CPC .......... *G11B 27/10* (2013.01); *G06F 17/3002* (2013.01); *G06F 17/30017* (2013.01); *G06F 17/30321* (2013.01); *G06F 17/30852* (2013.01); *G06F 17/30858* (2013.01)

(58) Field of Classification Search
CPC ......... G06F 17/30017; G06F 17/30321; G06F 17/30852; G06F 17/30858; G06F 17/3002; G11B 27/10
USPC ........................................................ 386/241
See application file for complete search history.

(56) References Cited

U.S. PATENT DOCUMENTS

| 4,009,331 A | 2/1977 | Goldmark et al. |
| 4,694,357 A | 9/1987 | Rahman et al. |
| 4,802,170 A | 1/1989 | Trottier |
| 4,964,069 A | 10/1990 | Ely |
| 5,119,474 A | 6/1992 | Beitel et al. |

(Continued)

FOREIGN PATENT DOCUMENTS

| CN | 1221284 A | 6/1999 |
| CN | 1723696 A | 1/2006 |

(Continued)

OTHER PUBLICATIONS

"OpenDML AVI File Format Extensions," Sep. 1997, Version 1.02, XP-002179318, OpenDML AVI M-JPEG File Format Subcommitee, 42 pgs.

(Continued)

*Primary Examiner* — Thai Tran
*Assistant Examiner* — Jose Mesa
(74) *Attorney, Agent, or Firm* — KPPB LLP

(57) ABSTRACT

Playback and distribution systems and methods for multimedia files are provided. The multimedia files are encoded with indexes associated with the content data of the multimedia files. Through the use of the indexes, playback of the content is enhanced without significantly increasing the file size of the multimedia file.

8 Claims, 11 Drawing Sheets

(56) References Cited

U.S. PATENT DOCUMENTS

| | | |
|---|---|---|
| 5,274,758 A | 12/1993 | Beitel et al. |
| 5,396,497 A | 3/1995 | Veltman |
| 5,412,773 A | 5/1995 | Carlucci et al. |
| 5,420,801 A | 5/1995 | Dockter et al. |
| 5,420,974 A | 5/1995 | Morris et al. |
| 5,471,576 A | 11/1995 | Yee |
| 5,485,611 A | 1/1996 | Astle |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,619,338 A | 4/1997 | Nakai et al. |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,356 A | 2/1998 | Hirayama et al. |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,903,261 A | 5/1999 | Walsh et al. |
| 5,907,597 A | 5/1999 | Mark |
| 5,915,066 A | 6/1999 | Katayama |
| 5,956,729 A | 9/1999 | Goetz et al. |
| 5,959,690 A | 9/1999 | Toebes, VIII et al. |
| 5,970,147 A | 10/1999 | Davis |
| 6,046,778 A | 4/2000 | Nonomura et al. |
| 6,065,050 A | 5/2000 | DeMoney |
| 6,079,566 A | 6/2000 | Eleftheriadis et al. |
| 6,169,242 B1 | 1/2001 | Fay et al. |
| 6,204,883 B1 | 3/2001 | Tsukagoshi |
| 6,308,005 B1 | 10/2001 | Ando et al. |
| 6,330,286 B1 | 12/2001 | Lyons et al. |
| 6,374,144 B1 | 4/2002 | Viviani et al. |
| 6,395,969 B1 | 5/2002 | Fuhrer |
| 6,665,835 B1 | 12/2003 | Gutfreund et al. |
| 6,671,408 B1 | 12/2003 | Kaku |
| 6,693,959 B1 | 2/2004 | Eckart et al. |
| 6,697,568 B1 | 2/2004 | Kaku |
| 6,725,281 B1 | 4/2004 | Zintel |
| 6,819,394 B1 * | 11/2004 | Nomura .............. G11B 27/034 352/38 |
| 6,856,997 B2 | 2/2005 | Lee et al. |
| 6,917,652 B2 | 7/2005 | Lyu |
| 6,931,531 B1 | 8/2005 | Takahashi |
| 6,944,629 B1 | 9/2005 | Shioi et al. |
| 6,985,588 B1 | 1/2006 | Glick et al. |
| 6,988,144 B1 | 1/2006 | Luken et al. |
| 7,103,906 B1 | 9/2006 | Katz et al. |
| 7,127,155 B2 | 10/2006 | Ando et al. |
| 7,206,940 B2 | 4/2007 | Evans et al. |
| 7,209,892 B1 | 4/2007 | Galuten et al. |
| 7,237,061 B1 | 6/2007 | Boic |
| 7,243,346 B1 | 7/2007 | Seth et al. |
| 7,246,127 B2 | 7/2007 | Murakami et al. |
| 7,330,875 B1 | 2/2008 | Parasnis et al. |
| 7,356,245 B2 | 4/2008 | Belknap et al. |
| 7,366,788 B2 | 4/2008 | Jones et al. |
| 7,454,780 B2 | 11/2008 | Katsube et al. |
| 7,457,359 B2 | 11/2008 | Mabey et al. |
| 7,493,018 B2 | 2/2009 | Kim |
| 7,788,271 B2 | 8/2010 | Soma et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 8,082,442 B2 | 12/2011 | Keljo et al. |
| 8,195,714 B2 | 6/2012 | Mckibben et al. |
| 8,233,768 B2 | 7/2012 | Soroushian et al. |
| 8,289,338 B2 | 10/2012 | Priyadarshi et al. |
| 8,341,715 B2 | 12/2012 | Sherkin et al. |
| 8,396,114 B2 | 3/2013 | Gu et al. |
| 8,407,753 B2 | 3/2013 | Kuo |
| 8,423,889 B1 | 4/2013 | Zagorie et al. |
| 8,472,792 B2 | 6/2013 | Butt et al. |
| 8,677,428 B2 | 3/2014 | Lewis et al. |
| RE45,052 E | 7/2014 | Li |
| 8,767,825 B1 | 7/2014 | Wang et al. |
| 8,832,434 B2 | 9/2014 | Apostolopoulos et al. |
| 8,856,218 B1 | 10/2014 | Inskip |
| 8,918,535 B2 | 12/2014 | Ma et al. |
| 8,948,249 B2 | 2/2015 | Sun et al. |
| 9,203,816 B2 | 12/2015 | Brueck et al. |
| 9,215,466 B2 | 12/2015 | Zhai et al. |
| 9,253,178 B2 | 2/2016 | Blom et al. |
| 9,344,721 B2 | 5/2016 | Dikvall |
| 9,369,687 B2 | 6/2016 | Braness et al. |
| 9,420,287 B2 | 8/2016 | Butt et al. |
| 9,479,805 B2 | 10/2016 | Rothschild et al. |
| 9,485,546 B2 | 11/2016 | Chen et al. |
| 9,584,557 B2 | 2/2017 | Panje et al. |
| 9,584,847 B2 | 2/2017 | Ma et al. |
| 9,813,740 B2 | 11/2017 | Panje et al. |
| 2001/0030710 A1 | 10/2001 | Werner |
| 2002/0034252 A1 | 3/2002 | Owen et al. |
| 2002/0051494 A1 | 5/2002 | Yamaguchi et al. |
| 2002/0062313 A1 | 5/2002 | Lee et al. |
| 2002/0091665 A1 | 7/2002 | Van Beek et al. |
| 2002/0093571 A1 | 7/2002 | Hyodo |
| 2002/0110193 A1 | 8/2002 | Yoo et al. |
| 2002/0118953 A1 | 8/2002 | Kim |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay |
| 2002/0180929 A1 | 12/2002 | Tseng et al. |
| 2002/0184159 A1 | 12/2002 | Tayadon et al. |
| 2002/0184515 A1 | 12/2002 | Oho et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0005442 A1 | 1/2003 | Brodersen et al. |
| 2003/0035488 A1 | 2/2003 | Barrau |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0133506 A1 | 7/2003 | Haneda |
| 2003/0165328 A1 | 9/2003 | Grecia |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0212993 A1 | 11/2003 | Obrador |
| 2004/0006701 A1 | 1/2004 | Kresina |
| 2004/0021684 A1 | 2/2004 | Millner |
| 2004/0025180 A1 | 2/2004 | Begeja et al. |
| 2004/0047614 A1 | 3/2004 | Green |
| 2004/0052501 A1 | 3/2004 | Tam |
| 2004/0071453 A1 | 4/2004 | Valderas |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0217971 A1 | 11/2004 | Kim |
| 2005/0005025 A1 | 1/2005 | Harville et al. |
| 2005/0055399 A1 | 3/2005 | Savchuk |
| 2005/0114534 A1 | 5/2005 | Lee |
| 2005/0180641 A1 | 8/2005 | Clark |
| 2005/0196147 A1 | 9/2005 | Seo et al. |
| 2005/0207442 A1 | 9/2005 | van Zoest et al. |
| 2006/0026302 A1 | 2/2006 | Bennett et al. |

(56) References Cited

U.S. PATENT DOCUMENTS

| | | |
|---|---|---|
| 2006/0093320 A1 | 5/2006 | Hallberg et al. |
| 2006/0129909 A1* | 6/2006 | Butt .................. G11B 20/10 |
| | | 715/201 |
| 2006/0168639 A1 | 7/2006 | Gan et al. |
| 2006/0235880 A1 | 10/2006 | Qian |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2008/0077592 A1 | 3/2008 | Brodie et al. |
| 2008/0120330 A1 | 5/2008 | Reed et al. |
| 2008/0120342 A1 | 5/2008 | Reed et al. |
| 2008/0177775 A1 | 7/2008 | Kawate et al. |
| 2008/0201705 A1 | 8/2008 | Wookey |
| 2008/0294691 A1 | 11/2008 | Chang et al. |
| 2009/0064341 A1 | 3/2009 | Hartung et al. |
| 2009/0132599 A1 | 5/2009 | Soroushian et al. |
| 2009/0165148 A1 | 6/2009 | Frey et al. |
| 2010/0218208 A1 | 8/2010 | Holden |
| 2011/0197267 A1 | 8/2011 | Gravel et al. |
| 2012/0017282 A1 | 1/2012 | Kang et al. |
| 2013/0055084 A1 | 2/2013 | Soroushian et al. |
| 2014/0211840 A1 | 7/2014 | Butt et al. |
| 2015/0104153 A1 | 4/2015 | Braness et al. |
| 2017/0025157 A1 | 1/2017 | Ahsan et al. |

FOREIGN PATENT DOCUMENTS

| | | |
|---|---|---|
| CN | 1873820 A | 12/2006 |
| CN | 101861583 A | 10/2010 |
| CN | 101861583 B | 6/2014 |
| EP | 0677961 A2 | 10/1995 |
| EP | 0757484 A2 | 2/1997 |
| EP | 1187483 A2 | 3/2002 |
| EP | 1420580 A1 | 5/2004 |
| EP | 1718074 A1 | 11/2006 |
| EP | 2223232 A1 | 9/2010 |
| HK | 1147813 | 8/2011 |
| JP | 07334938 A | 12/1995 |
| JP | 08163488 A | 6/1996 |
| JP | 08287613 A | 11/1996 |
| JP | 11328929 A | 11/1999 |
| JP | 2001043668 A | 2/2001 |
| JP | 2002170363 A | 6/2002 |
| JP | 2002218384 A | 8/2002 |
| JP | 2003023607 A | 1/2003 |
| JP | 2003250113 A | 9/2003 |
| JP | 2005027153 A | 1/2005 |
| JP | 2011505648 A1 | 2/2011 |
| JP | 5513400 B2 | 6/2014 |
| KR | 100221423 B1 | 6/1999 |
| KR | 2002013664 A | 2/2002 |
| KR | 20020064888 A | 8/2002 |
| SG | 161354 | 12/2012 |
| WO | 1995015660 A1 | 6/1995 |
| WO | 1998046005 A2 | 10/1998 |
| WO | 1999037072 A2 | 7/1999 |
| WO | 0104892 A1 | 1/2001 |
| WO | 2001031497 A1 | 5/2001 |
| WO | 2001050732 A2 | 7/2001 |
| WO | 2002001880 A1 | 1/2002 |
| WO | 2004054247 A1 | 6/2004 |
| WO | 2004097811 A1 | 11/2004 |
| WO | 2007026837 A1 | 3/2007 |
| WO | 2009065137 A1 | 5/2009 |
| WO | 2010108053 A1 | 9/2010 |
| WO | 2010111261 A1 | 9/2010 |
| WO | 2012094181 A2 | 7/2012 |
| WO | 2012094189 A1 | 7/2012 |

OTHER PUBLICATIONS

KISS Players, "KISS DP-500", retrieved from http://www.kiss-technology.com/?p=dp500 on May 4, 2007, 1 pg.

Broadq, "The Ultimate Home Entertainment Software", printed May 11, 2009 from ittp://web.srchive.org/web/20030401122010/www.broadq.com/qcasttuner/,1 pg.

European Supplementary Search Report for Application EP09759600, completed Jan. 25, 2011, 11 pgs.

Extended European Search Report for European Application EP15162562.1,Report Completed Jul. 21, 2015, dated Jul. 29, 2015, 4 Pgs.

Griffith, Eric, "The Wireless Digital Picture Frame Arrives", Wi-Fi Planet, Oct. 16, 2003, printed May 4, 2007 from http://www.wi-fiplanet.com/news/article.php/3093141, 3 pgs.

IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

International Preliminary Report on Patentability for International Application No. PCT/US2008/083816, dated May 19, 2010, 6 pgs.

International Search Report and Written Opinion for International Application No. PCT/US09/46588, completed Jul. 13, 2009, dated Jul. 23, 2009, 7 pgs.

International Search Report and Written Opinion for International Application No. PCT/US2004/041667, Completed May 24, 2007, dated Jun. 20, 2007, 6 pgs.

International Search Report and Written Opinion for International Application No. PCT/US2008/083816, completed Jan. 10, 2009, dated Jan. 22, 2009, 7 pgs.

Nadel, "Linksys Wireless-B Media Adapter Reviews", Jul. 30, 2013, printed May 4, 2007 from http://reviews.cnet.com/Linksys_Wireless_B_Media_Adapter/4505-6739_7-30421900.html?tag=box, 5 pgs.

Captain, "Future Gear: PC on the HiFi, and the TV", PC World.com, Jan. 21, 2003 from http://www.pcworld.com/article/id,108818-page,1/article.html, printed May 4, 2007, from IDG Networks, 2 pgs.

Linksys, "KISS DP-500", printed May 4, 2007 from http://www.kiss-technology.com/?p=dp500, 2 pgs.

Linksys, "Enjoy your digital music and pictures on your home entertainment center, without stringing wires!", Model No. WMA 11B, 2003, printed May 9, 2007 from http://www.linksys.com/servlet/Satellite?c=L_Product_C2&childpagename=US/Layout&cid=1115416830950&p, 4 pages.

Microsoft Corporation, "Chapter 8, Multimedia File Formats" 1991, Microsoft Windows Multimedia Programmer's Reference, 3 cover pgs. pp. 8-1 to 8-20.

Microsoft Windows XP Media Center Edition 2005, "Frequently asked Questions", 2007, printed May 4, 2007 from http://www.microsoft.com/windowsxp/mediacenter/evaluation/faq.mspx, 6 pages.

Microsoft Windows XP, "Media Center Edition 2005: Features", 2007, printed May 9, 2007, from http://www.microsoft.com/windowsxp/mediacenter/evaluation/features.mspx, 4 pgs.

Morrison, "EA IFF 85" Standard for Interchange Format Files, Jan. 14, 1985, printed from http://www.dcs.ed.ac.uk/home/mxr/gfx/2d/IFF.txt on Mar. 6, 2006, 24 pgs.

Open DML AVI-M-JPEG File Format Subcommittee, "Open DML AVI File Format Extensions", Version 1.02, Feb. 28, 1996, 29 pgs.

Qtv, "About BroadQ", 2009, printed May 11, 2009 from http://www.broadq.com/en/about.php, 1 pg.

Supplementary European Search Report for Application No. EP 04813918, Search Completed Dec. 19, 2012, 3 pgs.

Taxan, "AVel LinkPlayer2 for Consumer", I-O Data USA—Products—Home Entertainment, 2003, printed May 4, 2007 from http://www.iodata.com/usa/products/products.php?cat=HNP&sc=AVEL&pld=AVLP2/DVDLA&ts=2&tsc, 1 pg.

Windows XP Media Center Edition 2005, "Experience more entertainment", 2005, retrieved from http://download.microsoft.com/download/c/9/a/c9a7000a-66b3-455b-860b-1c16f2eecfec/MCE.pdf on May 9, 2007, 2 pgs.

Xbox, "Windows Media Center Extender for Xbox", printed May 9, 2007 from http://www.xbox.com/en-US/support/systemuse/xbox/console/mediacenterextender.htm, 2 pgs.

Extended European Search Report for European Application EP08849996.7, Report Completed Dec. 19, 2014, dated Jan. 23, 2015, 7 Pgs.

(56) References Cited

OTHER PUBLICATIONS

"Container format (digital)", Wikipedia, Aug. 17, 2009, printed Aug. 22, 2009 from http://en.wikipedia.org/wiki/Container_format_(digital), 4 pgs.

"DVD—MPeg differences", printed Jul. 2, 2009 from http://dvd.sourceforge.net/dvdinfo/dvdmpeg.html, 1 pg.

"DVD subtitles", Jan. 9, 2001, retrieved from sam.zoy.org/writings/dvd/subtitles on Jul. 2, 2009, 4 pgs.

"Final Committee Draft of MPEG-4 streaming text format", International Organisation for Standardisation, Feb. 2004, 22 pgs.

"Information Technology—Coding of audio-visual objects—Part 17: Streaming text", International Organisation for Standardisation, Feb. 2004, 22 pgs.

"Information technology—Coding of audio-visual objects—Part 18: Font compression and streaming", ISO/IEC 14496-18, First edition, Jul. 1, 2004, 26 pgs.

"Innovation of technology arrived", I-O Data, Nov. 2004, Retrieved from http://www.iodata.com/catalogs/AVLP2DVDLA_Flyer200505.pdf on May 30, 2013, 2 pgs.

"OpenDML AVI File Format Extensions", OpenDML AVI M-JPEG File Format Subcommittee, Sep. 1997, retrieved from www.the-labs.com/Video/odmlff2-avidef.pdf, 42 pgs.

"QCast Tuner for PS2", BradQ, LLC, 2003, printed May 11, 2009 from http://web.archive.org/web/20030210120605/www.divx.com/software/detail.php?ie=39, 2 pgs.

"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.

"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, 26 pgs.

"Video Manager and Video Title Set IFO file headers", printed Aug. 22, 2009 from http://dvd.sourceforge.net/dvdinfo/ifo.htm, 6 pgs.

"What is a DVD?", printed Aug. 22, 2009 from http://www.videohelp.com/dvd, 8 pgs.

"What is a VOB file", MPUCoder, 2009, http://www.mpucoder.com/DVD/vobov.html, printed on Jul. 2, 2009, 2 pgs.

"What's on a DVD?", printed Aug. 22, 2009 from http://www.doom9.org/dvd-structure.htm, 5 pgs.

Blasiak, "Video Transrating and Transcoding: Overview of Video Transrating and Transcoding Technologies,", Ingenient Technologies, TI Developer Conference, Aug. 6-8, 2002, 22 pgs.

Bochicchio et al., "X-Presenter: a tool for video-based hypermedia applications", AVI '04 Proceedings of the Working Conference on Advanced Visual Interfaces, May 25-28, 2004, pp. 437-440, XP002733976, DOI: 10.1145/989863.989945.

Casares et al., "Simplifying Video Editing Using Metadata", Human Computer Interaction Institute, DIS2002, 2002, pp. 157-166.

Fan et al., "Class View: Hierarchical Video Shot Classification, Indexing, and Accessing", IEEE Transactions on Multimedia, IEEE Service Center, Piscataway, NJ, US, vol. 6, No. 1, Feb. 1, 2004, pp. 70-86, XP011105807, ISSN: 1520-9210, DOI: 10.1I09/TMM.2003.8195.

Long et al., "Silver: Simplifying Video Editing with Metadata", CHI 2003: New Horizons, Apr. 5-10, 2003, pp. 628-629.

Nelson, "Arithmetic Coding+Statistical Modeling=Data Compression: Part 1—Arithmetic Coding", Doctor Dobb's Journal, Feb. 1991, USA, pp. 1-12.

Noboru, "Play Fast and Fine Video on Web! codec", Co.9 No. 12, Dec. 1, 2003, pp. 178-179.

Noe, A., "Matroska File Format (under construction!)", Jun. 24, 2007, Retrieved from the Internet: URL:http://web.archive.orgweb/20070821155146/www.matroska.org/technical/specs/matroska.pdf on Jan. 19, 2011, 51 pages.

Noe, Alexander , "AVI File Format", Dec. 14, 2006, retrieved from http://www.alexander-noe.com/video/documentation/avi.pdf, pp. 1-26.

Noe, Alexander, "Definitions", Apr. 11, 2006, retrieved from http://www.alexander-noe.com/video/amg/definitions.html on Oct. 16, 2013, 2 pages.

Phamdo, Nam, "Theory of Data Compression", printed from http://www.data-compression.com/theoroy.html on Oct. 10, 2003, 12 pgs.

Unknown, "AVI RIFF File Reference (Direct X 8.1 C++ Archive)", Microsoft, 2006, printed from http://msdn.microsoft.com/archive/en-us/dx81_c/directx_cpp/htm/avirifffilereference.asp?fr . . . on Mar. 6, 2006, 7 pgs.

Unknown, "Entropy and Source Coding (Compression)", TCOM 570, Sep. 1999, pp. 1-22.

Unknown, "MPEG-4 Video Encoder: Based on International Standard ISO/IED 14496-2", Patni Computer Systems, Ltd., printed Jan. 24, 2007, USA, pp. 1-15.

ISO/IEC 14496-2:2001(E), Information technology—Coding of audio-visual objects, Part 2: Visual, Dec. 1, 2001, 536 pgs, Annex A.1, section 7.4.1., section, 7.4.3., section 7.6.3, section 7.7.1., Annex B.

Transmission of Non-Telephone Signals, Video Coding for Low Bit Rate Communication, ITU-T Recommendation H.263, ITU-T Telecommunication Standardization Sector of ITU, Mar. 1996, 52 pgs.

W3C, Eds. Klyne, G. et al., Resource Description Framework (RDF): Concepts and Abstract Syntax, Section 3.3, Oct. 10, 2003, available online at https://www.w3.org/TR/2003/WD-rdf-concepts-20031010/#section-Datatypes-intro.

"AVI", OpenNET, Mar. 5, 2003, available at https://web.archive.org/web/20030305042201/http://www.opennet.ru/docs/formats/avi.txt.

"AVI files and common problems", virtualdub.org, Current version: v1.10.4, Nov. 11, 2004, Retrieved from: http://www.virtualdub.org/blog/pivot/entry.php?id=25, 14 pgs.

"DCMI Metadata Terms: A complete historical record", Dublin Core Metadata Initiative, Dec. 18, 2006, showing Term name: title, version 004, Date modified Oct. 14, 2002, available at http://dublincore.org/usage/terms/history/#title-004.

"ISO/IEC 8859-1", Wikipedia, Last updated Aug. 8, 2017, Retrieved from: https://en.wikipedia.org/wiki/ISO/IEC_8859-1, 8 pgs.

"Multimedia Programming Interface and Data Specifications 1.0", IBM Corporation and Microsoft Corporation, Ch. 2 (RIFF), Aug. 1991.

Alvestrand, "Tags for the Identification of Languages", Jan. 2001, Retrieved from: http://www.ietf.org/rfc/rfc3066.txt, 12 pgs.

Lee et al., "Uniform Resource Identifiers (URI): Generic Syntax", Aug. 1998, Retrieved from: http://ietf.org/rfc/rfc2396.txt, 35 pgs.

Pearce, Chris "Indexing keyframes in Ogg videos for fast seeking", Retrieved from: http://blog.pearce.org.nz/2010/01/indexing-keyframes-in-ogg-videos-for.html, Jan. 11, 2010, 4 pgs.

Final draft ETSI ES 202 109, V1.1.1, ETSI Standard, Terrestrial Trunked Radio (TETRA); Security; Synchronization mechanism for end-to-end encryption, Oct. 2002, 17 pgs.

International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.

3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.

"Draft CR: Trick Mode for HTTP Streaming", 3GPP TSG-SA4 Meeting #58, Apr. 26-30, 2010, Vancouver, Canada, S4-100237, 3 pgs.

Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.

Bloom et al., "Copy Protection for DVD Video", Proceedings of the IEEE, vol. 87, No. 7, Jul. 1999, pp. 1267-1276.

Concolato et al., "Live HTTP Streaming of Video and Subtitles within a Browser", MMSys 2013, Feb. 26-Mar. 1, 2013, Oslo, Norway, 5 pgs.

Eskicioglu et al., "An Integrated Approach to Encrypting Scalable Video", Proceedings IEEE International Conference on Multimedia and Expo, Aug. 26-29, 2002, Lausanne, Switzerland, 4 pgs.

(56) References Cited

OTHER PUBLICATIONS

Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.

Hurtado Guzman, Juan Esteban, "Development and Implementation of an Adaptive HTTP Streaming Framework for H264/MVC Coded Media", Politecnico di Torino, Nov. 2010, 108 pgs.

Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.

Lian et al., "Efficient video encryption scheme based on advanced video coding", Multimed. Tools Appl. vol. 38, 2008, pp. 75-89.

Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, pp. 325-344.

Moscoso, Pedro Gomes, "Interactive Internet TV Architecture Based on Scalable Video Coding", Instituto Superior Techico, Universidad Technica de Lisboa, May 2011, 103 pgs.

Ozer, Jan, "Adaptive Streaming in the Field", Streaming Media, Dec. 2010-Jan. 2011, pp, 36-47.

Padiadpu, Rashmi, "Towards Mobile Learning: A SCORM Player for the Google Android Platform", Master Thesis, Hamburg University of Applied Sciences, 2008, 66 pgs.

Peek, David, "Consumer Distributed File Systems", Dissertation, Doctor of Philosophy, Computer Science and Engineering, The University of Michigan, 2009, 118 pgs.

Rosenberg et al., "Indicating User Agent Capabilities in the Session Initiation Protocol (SIP)", Network Working Group, RFC 3840, Aug. 2004, 36 pgs.

Venkatramani et al., "Securing Media for Adaptive Streaming", Multimedia 2003 Proceedings of the Eleventh ACM International Conference on Multimedia, Nov. 2-8, 2003, Berkeley, California, 4 pgs.

\* cited by examiner

HIERARCHICAL AND REDUCED INDEX STRUCTURES FOR MULTIMEDIA FILES

CROSS-REFERENCE TO RELATED APPLICATIONS

This application is a continuation of U.S. patent application Ser. No. 13/560,884, entitled "Hierarchical and Reduced Index Structures for Multimedia Files" to Soroushian et al., filed Jul. 27, 2012, which application is a continuation of U.S. patent application Ser. No. 12/272,631, entitled "Hierarchical and Reduced Index Structures for Multimedia Files" to Soroushian et al., which issued on Jul. 31, 2012 as U.S. Pat. No. 8,233,768, which application claims priority under 35 U.S.C. § 119(e) to U.S. Provisional Application No. 60/988,513, entitled "Hierarchical and Reduced Index Structures for Multimedia Files" to Soroushian et al., filed Nov. 16, 2007. The disclosures of application Ser. Nos. 13/560,884, 12/272,631, and 60/988,513 are incorporated by reference in their entirety.

BACKGROUND

The present invention relates generally to multimedia files and more specifically to the indexing of information within a multimedia file.

In recent years, the playback of multimedia files has become an integrated part of the average consumer's daily life. Cellular telephones, DVD players, personal computers, and portable media players are all examples of devices that are capable of playing a variety of multimedia files. While each device may be tailored to a particular multimedia format, the extensive proliferation of these devices encourages a certain level of interoperability amongst the different device classes and categories. Likewise, there are certain features such as fast-forward, reverse, start, stop, play, and pause which are expected to behave similarly across all device categories, despite their performance capabilities and use-case application.

One of the most common features of media playback devices is the support for random access, fast-forward and reverse playback of a multimedia file, which is sometimes referred to as "trick play". Performing trick play functionality generally requires displaying the video presentation at a higher speed in forward and reverse direction, and resuming the overall presentation from a position close to where the viewer terminated the video trick play activity. The audio, subtitle, and other elements of the presentation are typically not used during trick play operations, even though that can be subject to a device's operating preference. In accommodating trick play functionality, multimedia files typically contain an index section used to determine the location of all frames, and specifically the video frames which can be independently decoded and presented to the viewer. When all index information is stored in a single location within a file and linearly references the multimedia information within the file, a player must seek to a specific index entry in order to be able to play a file. For example, a player that is instructed to play a multimedia presentation at the half-way point of the presentation typically processes the first half of the index data before being able to determine the set of data points required to commence playing.

The index section has many other potential applications as well: it may be a necessary element in basic playback of multimedia files that exhibit poor multiplexing characteristics; the index section may also be used to skip over non-essential information in the file; also, an index is often required for the resumption of playback after the termination of trick play functions.

SUMMARY

Embodiments of the invention utilize indexes that can increase the efficiency with which a player can perform a variety of functions including trick play functions. In several embodiments, the index is a hierarchical index. In many embodiments, the index is a reduced index and, in a number of embodiments, the index is expressed using bit field flags and associated data fields.

DETAILED DESCRIPTION

Turning now to the drawings, multimedia files including indexes in accordance with embodiments of the invention are described. In a number of embodiments, the index is a hierarchical index. A hierarchical index is a representation of index information in a form that provides a coarse index to a few predetermined locations within the multimedia file followed by a further refined representation of the portions of the multimedia file. In many embodiments, the lowest level of the index is sufficiently granular as to identify every frame in the multimedia file. When a hierarchical index is used, a player need only request a small amount of relevant index information in order to commence playing a multimedia file. As such, the hierarchical index lowers the memory footprint needed by playback devices to effectively seek and perform trick-play operations on a multimedia file. Additionally, file load times for playback are reduced and trick-track load performance enhanced. In one embodiment, the hierarchical index has index information that includes offsets into cue points within a multimedia file with timestamps allows lookups to be fast and efficient.

In several embodiments, the multimedia file includes a reduced index. Players in accordance with embodiments of the invention can utilize a reduced index to rapidly move between accesses or key-frames when performing trick play functions. The reduced index can be in conjunction with a hierarchical index. However, reduced indexes can be included in multimedia files that do not include a hierarchical index. A reduced index only provides the location of the accesses or key-frames within a multimedia file, along with a time-stamp value to indicate their corresponding time within the multimedia presentation. In a number of embodiments, bit field flags and associated data fields are used to represent index information. Such a representation can be used in accordance with embodiments of the invention to express index information, a hierarchical index and/or a reduced index.

Hierarchical Indexes

Figure 1:
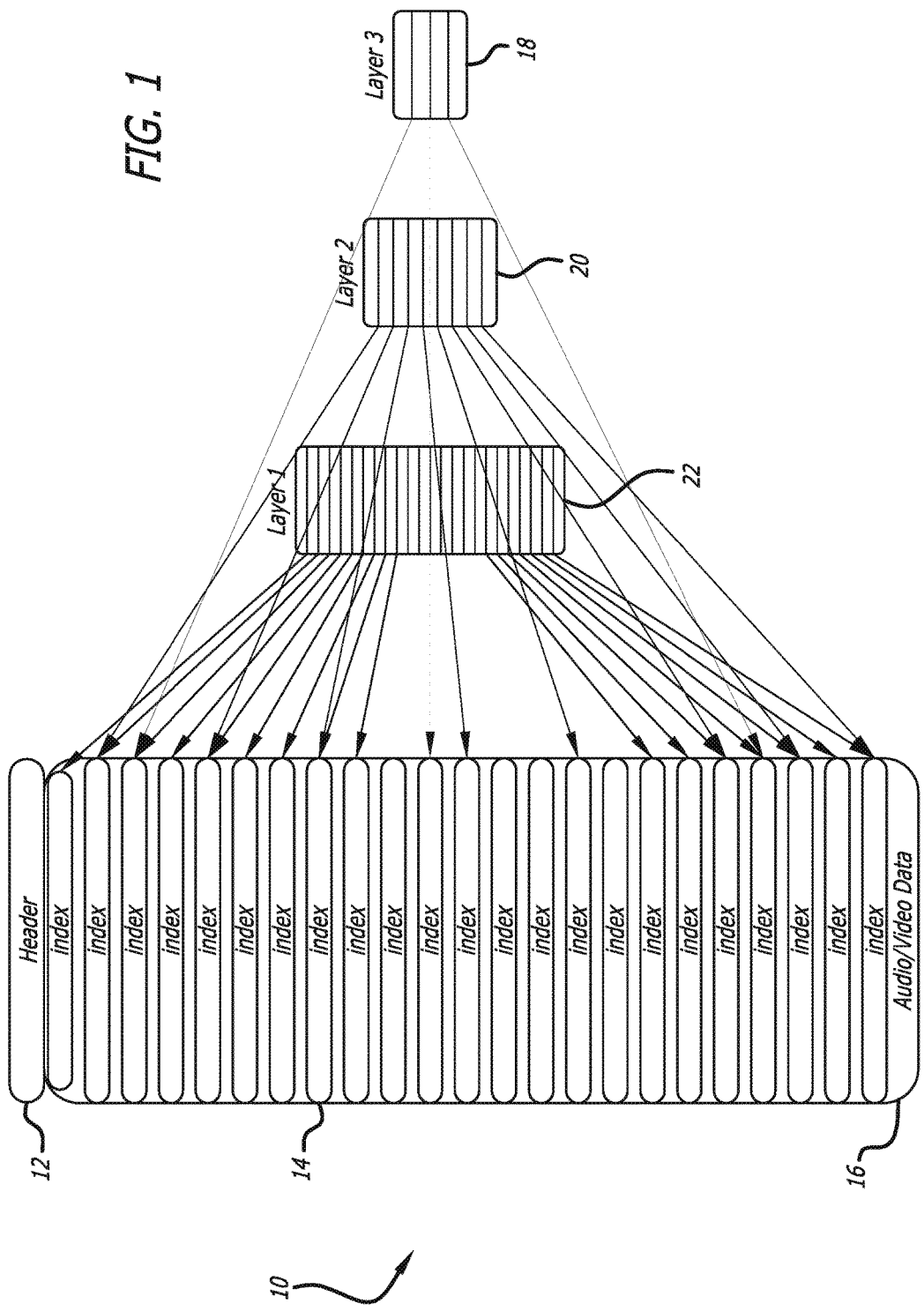
FIG. 1 is a graphical representation of an index structure within a multimedia file in accordance with an embodiment of the invention.

A multimedia file containing a hierarchical index in accordance with an embodiment of the invention is shown in FIG. 1. The multimedia file 10 includes header information 12, index information 14 interleaved amongst audio/video data 16 and a three layer hierarchical index. The coarsest layer 18 of the hierarchical index includes a small number of references to pieces of index information. The middle layer 20 and the finest layer 22 each include successively larger numbers of references to index information.

In many embodiments, the index information 14 interleaved amongst the audio/video data 16 lists the location of encapsulated audio, video, subtitle, and/or other similar data. Typically, each block of interleaved index information lists the encapsulated media immediately following the block of interleaved index information. In several embodiments, the index information 14 contains information that describes the absolute or relative location of the start of each piece of encapsulated media. In a number of embodiments, the interleaved index information 14 includes the size of each indexed piece of encapsulated media, in addition to information indicating whether the indexed piece of encapsulated media can be used as an access or key-frame, its presentation time value, and other information, which may be helpful to a decoding device.

Each layer in the hierarchical index includes references to the interleaved index information 14 within the multimedia file 10. The implementation of the hierarchy structure can be inclusive or exclusive, meaning that the data in each layer can be repeated in the other layers or each layer may contain unique position information. In addition, the number of elements at each layer of a hierarchy and the total number of layers can be pre-determined, limited based on pre-determined values, or unbounded.

Figure 2B:
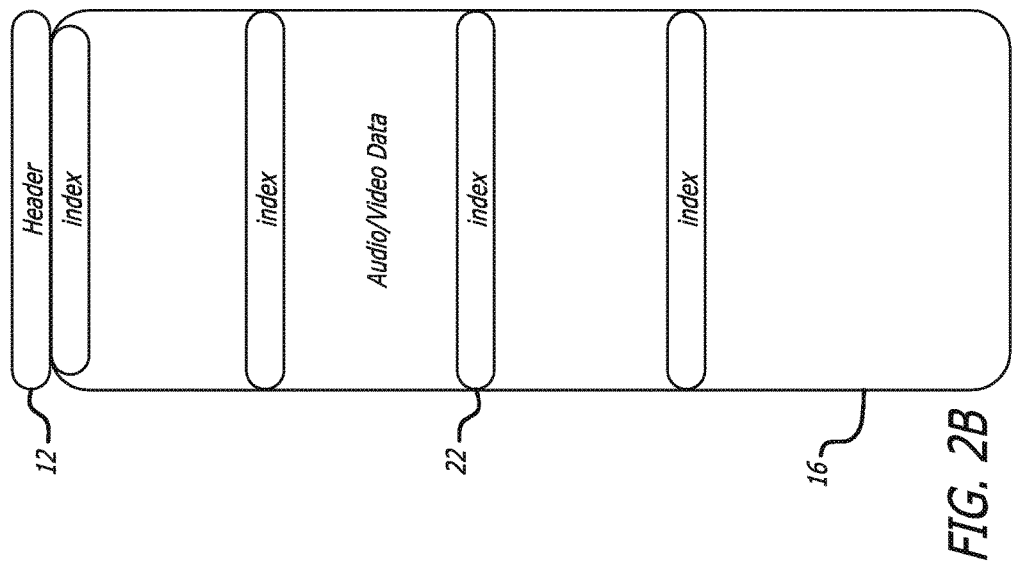
FIG. 2B is a graphical representation of an index structure interleaved within the audio/video data of a multimedia file in accordance with another embodiment of the invention.
Figure 2A:
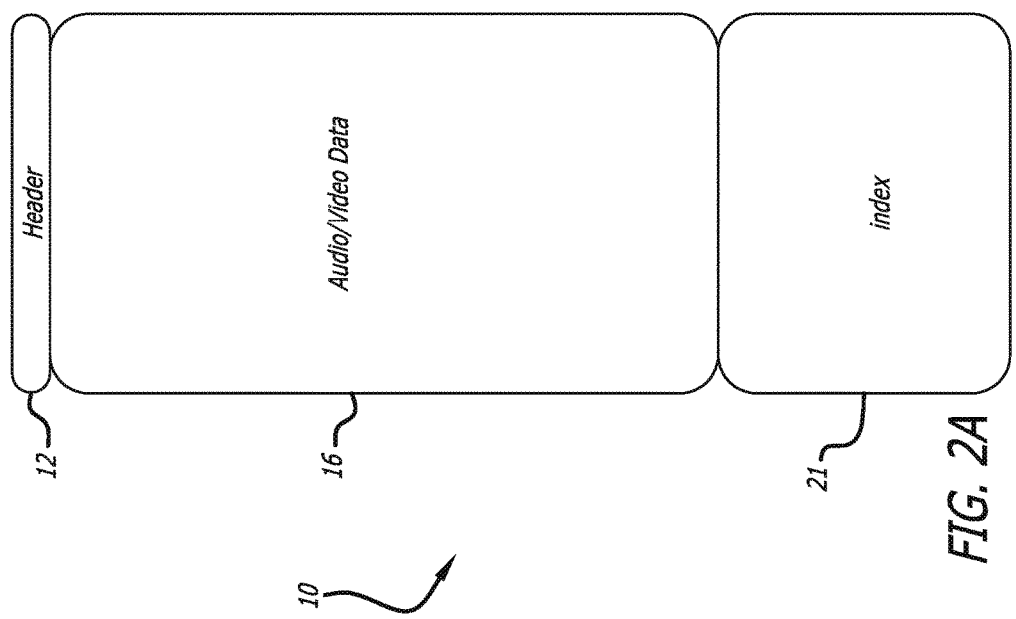
FIG. 2A is a graphical representation of an index structure following the audio/video data of a multimedia file in accordance with an embodiment of the invention.

Although a specific implementation of a hierarchical index is shown in FIG. 1, hierarchical indexes can be implemented in many different ways. For example, the index values can be stored in a single part of the file, or distributed in clusters in the file. Multimedia files containing different distributions of index information in accordance with embodiments of the invention are shown in FIGS. 2A-B. For example, the index information could be appended or prepended to the audio/video data portion 16 of the multimedia file 10 as an entire unit 21. Index clusters 22 shown in FIG. 2B can also be woven into the audio/video data portion. In addition to distributing index information in different ways, the hierarchy itself can be implemented as a structure that points to the actual frames in a file (as opposed to blocks of index information), which may or may not start with access or key-frame positions.

Figure 2C:
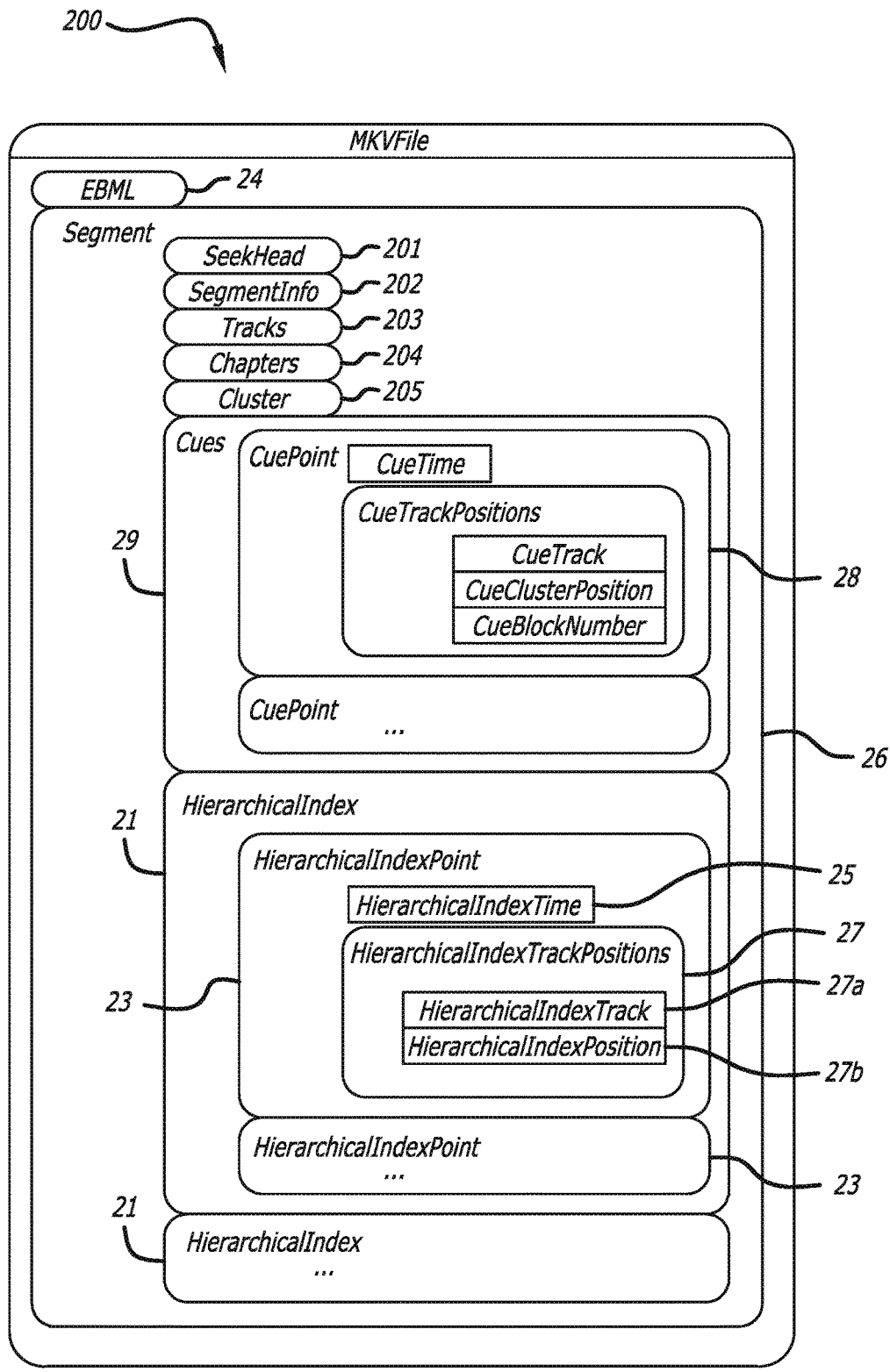
FIG. 2C is a detailed graphical representation of an index structure relative to other portions of a multimedia file in accordance with an embodiment of the invention.
Figure 2D:
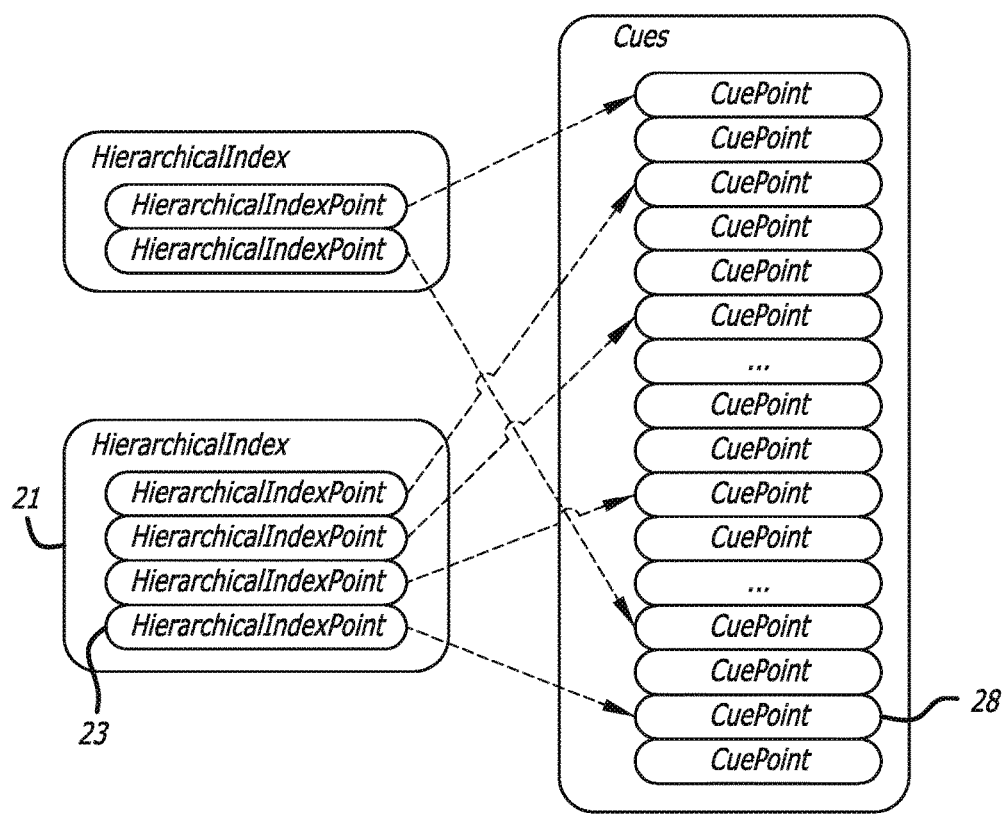
FIG. 2D is a graphical representation of an index structure relative to cue data of a multimedia file in accordance with an embodiment of the invention.

FIG. 2C further details the hierarchical index 21 within a larger hypothetical file structure MKV file 200. This file structure is made of two primary sections, the EBML 24 and the Segment 26. In this file structure, the Segment may host the Seek Head 201, Segment Info 202, Tracks 203, Chapters 204, Cluster 205, Cues 29, and a Hierarchical Index 21. As shown, a plurality of hierarchical indexes 21 could be included with the multimedia file. Additionally, each hierarchical index can include multiple hierarchical index points 23. These index points in various embodiments have a timestamp 25 and a track position 27, specifying a specific media track 27a and a position or offset 27b from the timestamp 25. Cues 29 are also shown and as will be explained in more detail below are utilized by the index points 23 to increase access to specific points within a multimedia file. This dynamic structure for example is shown in FIG. 2D where multiple hierarchical index points 23 reference or point to multiple cue points 28. In various embodiments, the hierarchical index contains references to a fraction, e.g., one tenth, of cue points relative to the total number of cue points in a media file. One would appreciate that the references can increase to increase the granularity of pointers or references to the cue points.

A player attempting to decode a multimedia file that includes a hierarchical index in accordance with an embodiment of the invention typically uses the hierarchical index as necessitated by the functions the player is requested to perform. When trick play functions are requested, the player can locate an index in the hierarchy corresponding to a specific speed and decode each of the frames indicated by the index. The manner in which a specific frame is located using the index depends upon the nature of the index. In embodiments where each index in the hierarchy points directly to video frames, then the process is simple. In embodiments where the index points to additional index information within the multimedia file, the additional index information is accessed and used to locate a desired frame.

Reduced Indexes

Many multimedia files in accordance with embodiments of the invention use reduced index information. Reduced indexes can be used in conjunction with a hierarchical index or in multimedia files that do not include a hierarchical index. A reduced index does not include information concerning every piece of multimedia information within a multimedia file. A reduced index typically is restricted to information concerning the location of access or key-frames and the time stamp of the access or key-frames. Access frames are generally video frames that can be independently decoded, although the reduced index can be used to point to any other type of key-frame for other streams stored in the multimedia file. The reduced index can enable a player to rapidly skip between key frames when performing trick play functions.

In a number of embodiments, a reduced index is only provided for a single or primary data type and offsets are provided for each of the other streams of data contained within the file which may be related to the primary data type. The offsets can be used by a player to facilitate synchronized playback of different media. In several embodiments, each piece of index information also includes the size of the access or key-frame and the data-type of the access or key-frame. A player decoding a multimedia file that contains a reduced index in accordance with an embodiment of the invention can use the reduced index to perform trick play functions in a similar fashion to the way in which a player uses a hierarchical index. The player can sequence through the reduced index inspecting the Timestamps of access or key frames to ascertain which frames to render in order to achieve a desired speed.

Expressing Index Information Using Bit Fields

Figure 3:
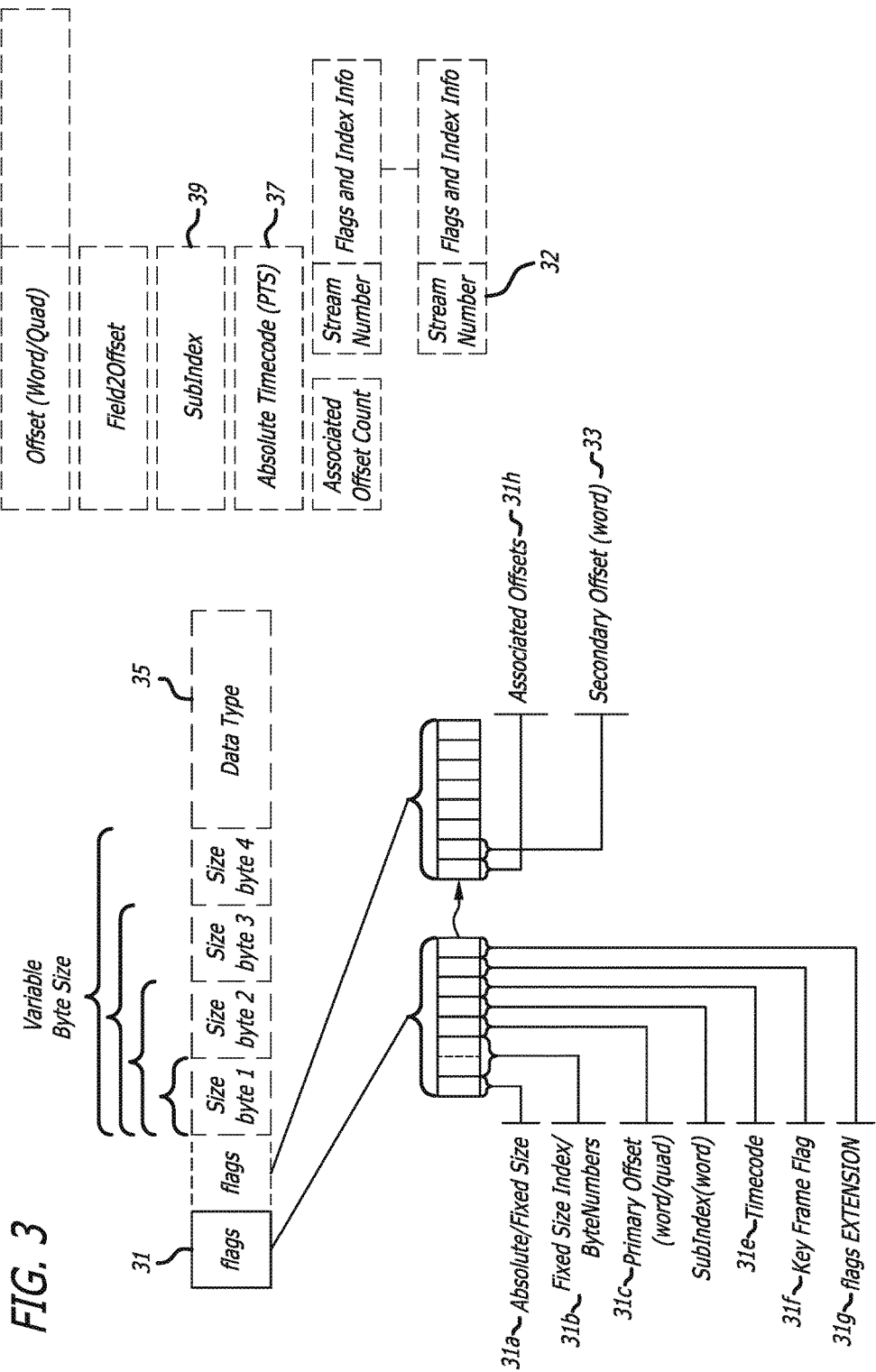
FIG. 3 is a graphical representation of index structure detailing bit flags and associated data filed within a multimedia file in accordance with an embodiment of the invention.

Multimedia files in accordance with a number of embodiments of the invention utilize bit field flags and associated data fields to express index information. In many embodiments, the bit field flags are used to signal the presence of a set of corresponding variable length data fields that contain index information. Bit field flags 31 and data fields 32 that can be used to express index information concerning a piece of multimedia information in accordance with an embodiment of the invention are shown in FIG. 3. In the illustrated embodiment, a set of bit-field flags signals the presence of additional data following the flags. The bit-field flags are specified as 8-bits in their entirety, but that is not necessarily a requirement for other implementations. The first bit of the flag may indicate an Absolute/Fixed Size field 31*a*, which determines whether the size of the frame is read from a pre-determined set of sizes stored in a separate section of the file, or whether they are available as a series of bytes following the flags field. Two additional bits, Fixed Size Index/Byte Numbers field 31*b*, are used to determine the index-position of the size value or the total number of bytes used to represent the value, depending on the setting of the Absolute/Fixed Size bit or field 31*a*. The next bit, a Primary Offset field 31*c*, determines the size of the offset value, which may be the location of the frame. This bit is selected amongst two pre-determined byte numbers, for example either a 4-byte value or 8-byte value. Likewise, a flag may indicate the presence of another predetermined offset, e.g., a Secondary Offset 33, which can be 4 bytes and represents a relative offset from the Primary Offset value. A bit 31*e* indicating the presence of a timecode byte sequence may also be present, along with another bit, Key Frame Flag bit 31*f*, which can be used to determine the presence of access or key frames. In many embodiments, bit field flags and data fields similar to those shown in FIG. 3 are used to index the location of all frames in a multimedia file.

The number of flags that can be represented via the structure shown in FIG. 3 is infinitely extensible using a "Flags Extension" bit 31*g* which signals the presence of a follow-on flag. Here, one bit 31*h* may be referred to as "Associated Offsets". Associated offsets may then signal the presence of a byte value, which is used to determine the number of streams which correspond to the current frame. These relative offsets may use the same flag and subsequent index information for other frames in the stream, to be used for synchronization purposes. The frames identified by the relative offsets, when played back correctly, may provide a synchronized presentation of audio, video, subtitles, and other related data. The stream number value 32 often corresponds to the actual stream numbers stored in the file.

Figure 4:
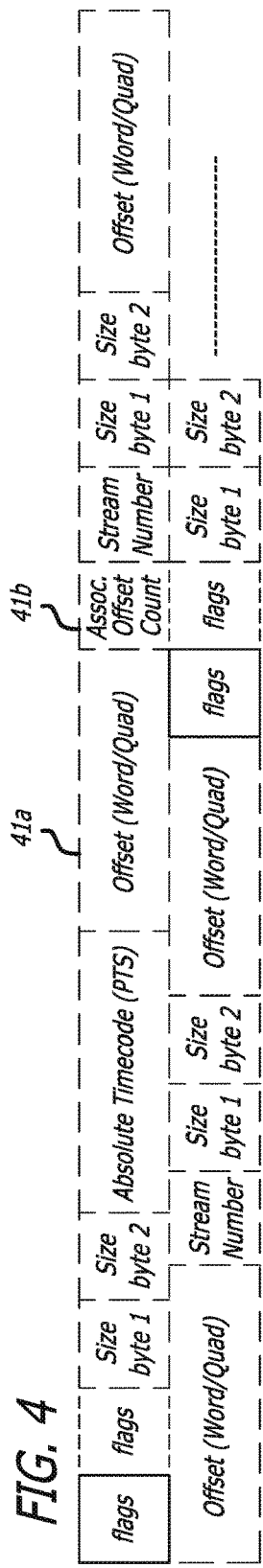
FIG. 4 is a graphical representation of index structure providing time codes and offset data fields within a multimedia file in accordance with an embodiment of the invention.

Index information represented using the two relative offset values 41*a,b* is shown in FIG. 4. In many embodiments, the data type for each frame is indicated for an entire group of frames, or alternatively is indicated on a frame-by-frame basis, in which case a "Data Type" field 35 is added to the index-structure. The presence of a Timecode value 37 to indicate the exact time of a frame in an overall presentation may be done via a set of pre-determined specifications. For example, the Timecode value could be required for all video access frames; alternatively, the presence of a Timecode could be mandatory on a periodic basis for audio samples. It is only important to note that the Timecode value is optionally present and is indicated by a corresponding bit-flag.

Figure 5:
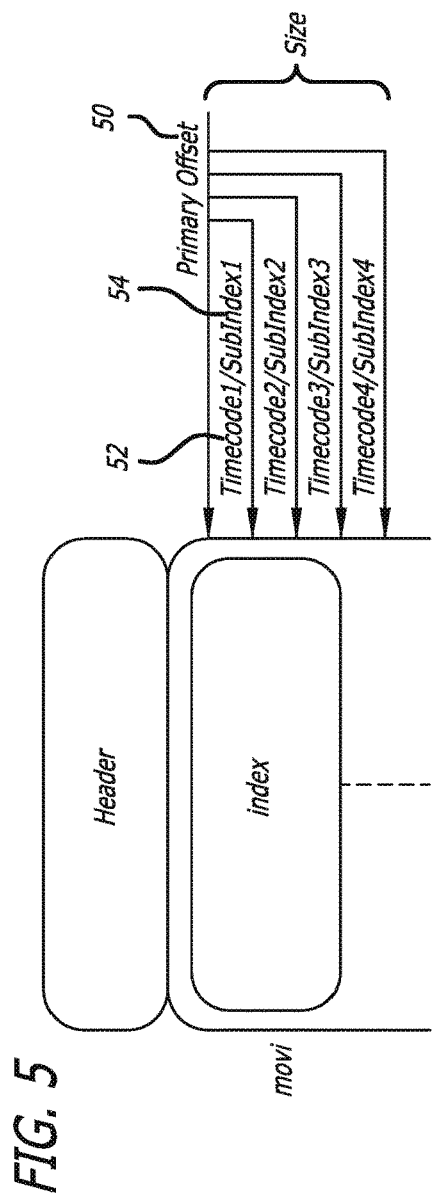
FIG. 5 is a graphical representation of index structure with time codes and multiple offset data fields relative to a size data field within a multimedia file in accordance with an embodiment of the invention.

Through a set of pre-determined rules, structures similar to those described above can be applied for the representation of hierarchical indexing in accordance with embodiments of the invention. For example, the "Primary Offset" value 50 can point to a specific index position, along with the Timecode value 52 indicating the exact time-stamp of the index. An additional bit-field 39, the "Subindex", can point to a relative offset from the position indicated by the "Primary Offset". This "Subindex" position 54 is a refinement from the beginning of a larger index cluster. Use of various values to construct a hierarchical index in accordance with an embodiment of the invention is shown in FIG. 5.

Figure 6:
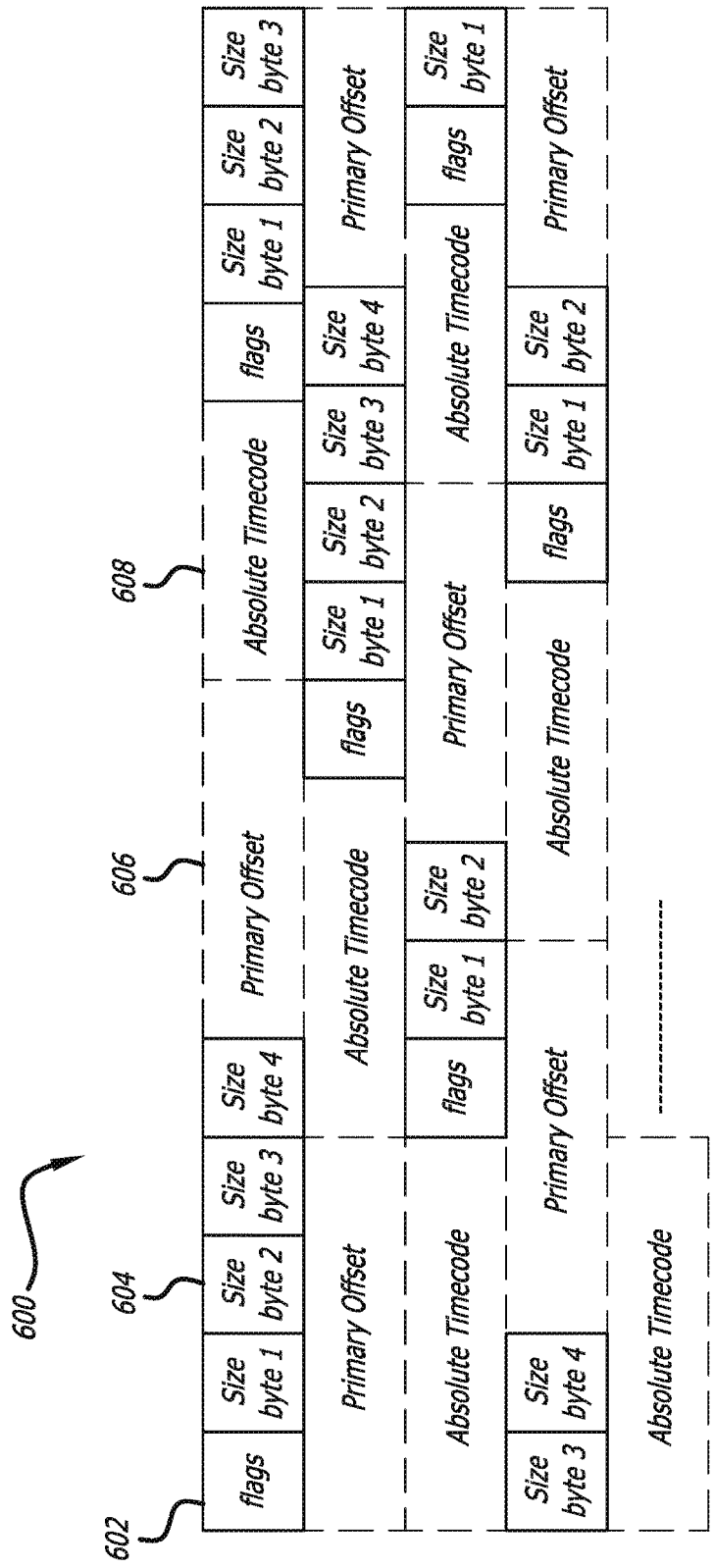
FIG. 6 is a graphical representation of index structure with time codes and primary offset data fields within a multimedia file in accordance with an embodiment of the invention.

Bit field flags and associated data fields can also be used to represent a reduced index structure pointing to a series of access or key frames for a particular stream in a file. A reduced index in accordance with an embodiment of the invention is shown in FIG. 6. In the illustrated embodiment, the "flags" field 602 is followed by a corresponding set of size bytes 604, a "Primary Offset" value 606, and a Timecode 608. The access frames may typically be related to video frames in a file, though again this field could be defined for all stream types in a file. The structure 600 shown in FIG. 6 stores the location of all access or key-frames, and can contain the location of all related offsets for the encapsulated tracks in the file.

It is important to note that the use of flexible bit field flags enables the implementation of multiple data structures which may appear in the hierarchical, reduced, and conventional indexing schemes. The use of bit fields as flags indicating variable length data can help optimize the size of an overall index because not all members are in general required by all frames.

Figure 7:
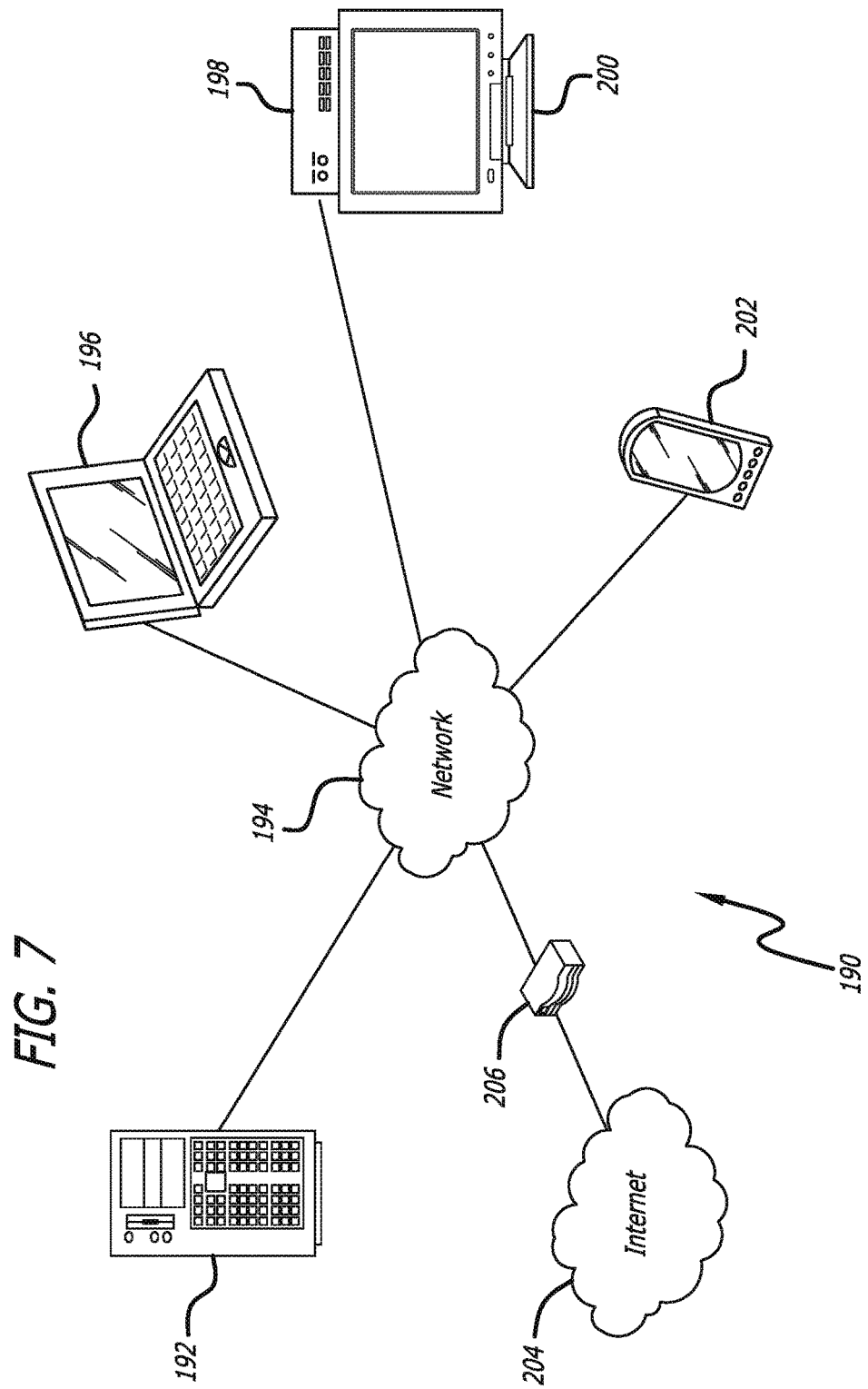
FIG. 7 is a semi-schematic network diagram of playback system for streaming and fixed media file playback in accordance with an embodiment of the invention.
Figure 8:
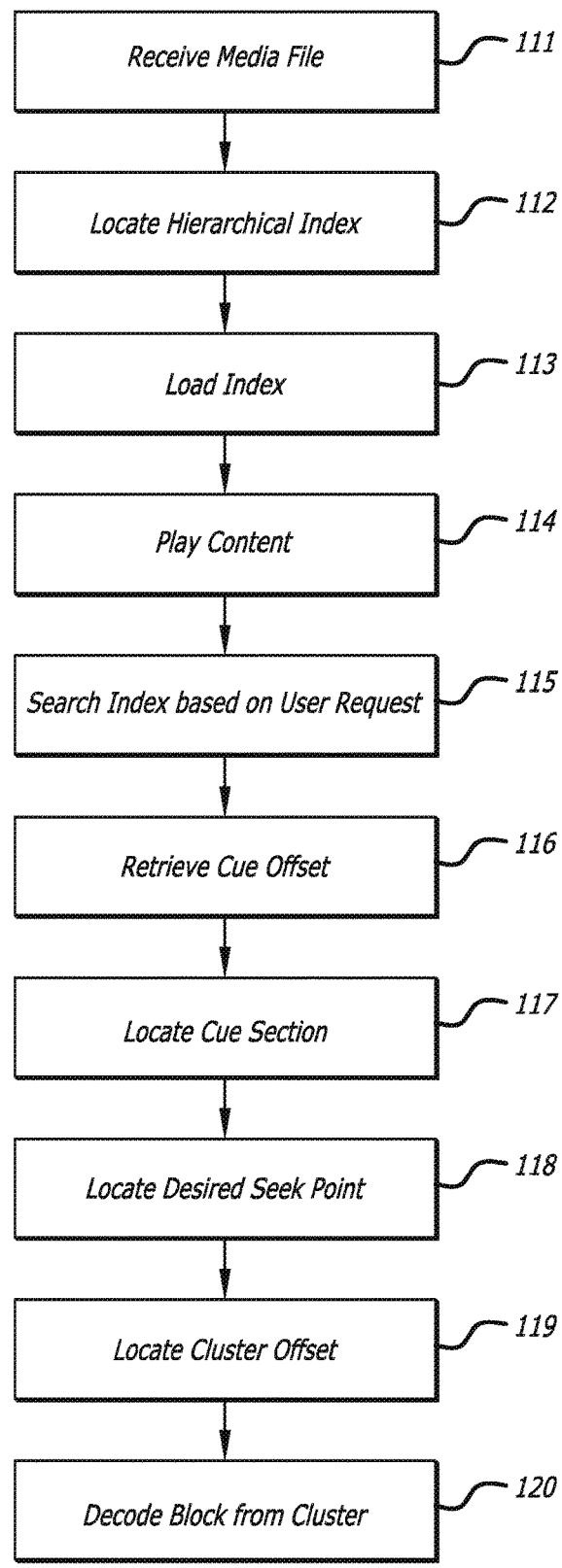
FIG. 8 is a flowchart of a process utilizing index structure within a multimedia file in accordance with an embodiment of the invention.
Figure 9:
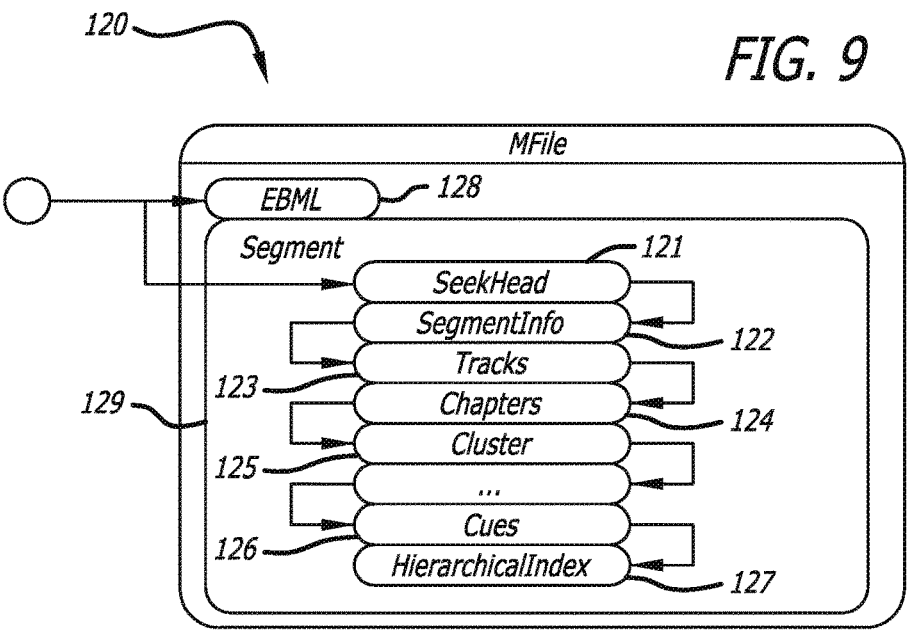
FIG. 9-11 are graphical representations with increasing detail of an index structure within a multimedia file in accordance with one embodiment of the invention and to further illustrate the process of FIG. 8.

Referring now to FIG. 7, a progressive playback system in accordance with an embodiment of the invention is shown. The playback system 190 includes a media server 192 connected to a network 194. Media files are stored on the media server 194 and can be accessed by devices configured with a client application. In the illustrated embodiment, devices that access media files on the media server include a personal computer 196, a consumer electronics device such as a set top box 18 connected to a playback device such as a television 200, and a portable device such as a personal digital assistant 202 or a mobile phone handset. The devices and the media server 192 can communicate over a network 194 that is connected to the Internet 204 via a gateway 206. In other embodiments, the media server 192 and the devices communicate over the Internet.

The devices are configured with client applications that can request portions of media files from the media server 192 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Referring to FIGS. 8-11, one embodiment of a process of utilizing the index structure is shown. A media file, e.g., MFile 120, is received from, for example, a media server based on a media file request from a playback device or in particular a playback engine of the playback device (111). Upon locating the requested media file, the media server transmits all or some portions at a time of the media file to the playback device. The playback device in one embodiment decodes the transmitted media file to locate the hierarchical index (112). In one such embodiment, referring to FIG. 9, the playback device traverses or parses the file starting from EBML (Extensible Binary Meta Language) element 128, the Segment element 129 and then the contents of the Seek Head 121 to locate the Hierarchical Index 127. As such, the Segment information 122, Tracks 123, Chapters 124, Clusters 125 and Cues 126, although could be also parsed, can be bypassed to quickly locate the Hierarchical Index. The located Index is then loaded into memory (113). Loading the Index into memory facilitates access to locate a desired packet or frame to be displayed or accessed by the playback device.

The Hierarchical Index is small enough for many low memory playback devices, e.g., low level consumer electronic devices, to hold the entire Index in memory and thus avoiding a complex caching scheme. In cases, where the Index is too large to store in memory or generally more feasible, no loss in seek accuracy occurs. With the Index being a lookup table or mechanism into the cues or defined seek points for each of the tracks and not the actual seek points, the dropping of portions of the Index can cause a few additional reads when searching the cues for a desired seek point. The playback device accesses the bit stream packets or frames of the transmitted media file to play the audio, video, and/or subtitles of the media file (114).

Upon a user request, e.g., a trick-play request, the playback device searches the loaded or cached Hierarchical Index to find an entry or hierarchical point equal to or nearest and preceding to the desired time or seek point (115). In one embodiment, the particular hierarchical point is located based on the presentation time or timestamp of the content being played and the user request, e.g., the speed and/or direction of trick-play function. In the illustrated case, FIGS. 10-11, the desired timestamp is 610 seconds within the bit stream.

Figure 10:
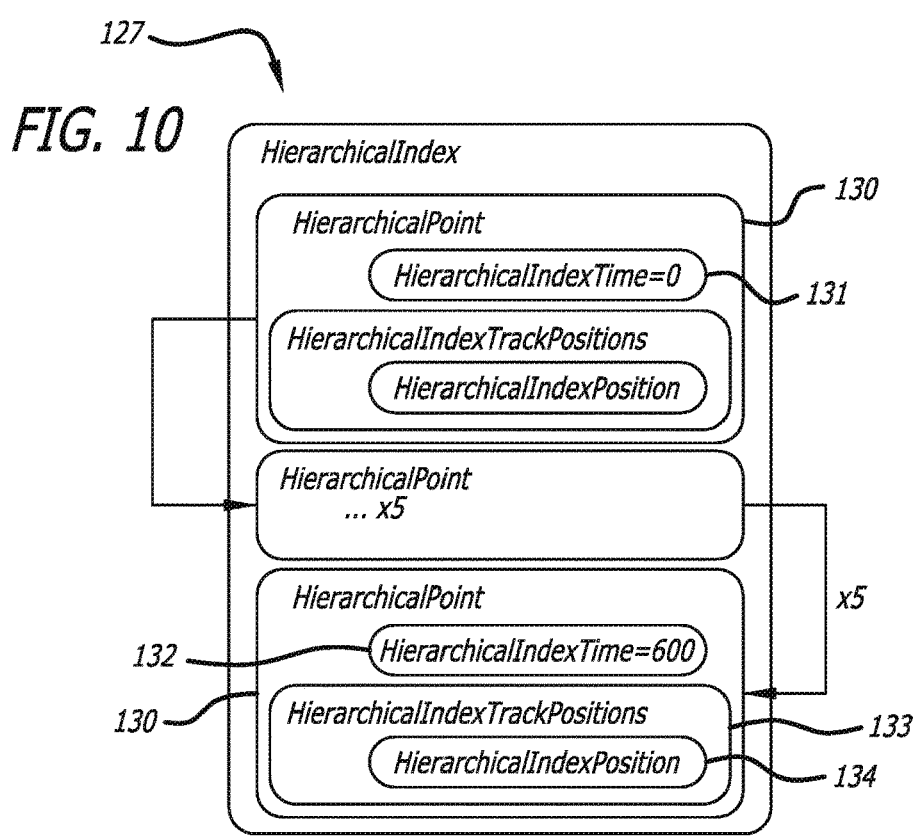

FIG. 10 demonstrates a total of 6 hierarchical access points 130, starting from Index Time zero (Hierarchical Index Time 131) to Index Time 600 (Hierarchical Index Time 132), where five of the Hierarchical Points on this diagram have not been shown. After locating the closest hierarchical point to the desired seek time (in this case Index Time 600), an Index Position or offset 134 is retrieved from Track Position 133 to locate a portion of cues that contains the desired seek point (116). The playback device seeks to the located portions of cues (117) and the cues are read through until an entry equal to, or nearest and preceding to the desired time or seek point is located (118).

Utilizing the located cue, the playback device retrieves an offset value to seek and find the desired cluster (119). A block in the desired cluster that has a corresponding timestamp as the desired timestamp, e.g., 610, is located and decoded (120) for display by the playback device. The process continues until a user request stops playback of the media file.

Figure 11:
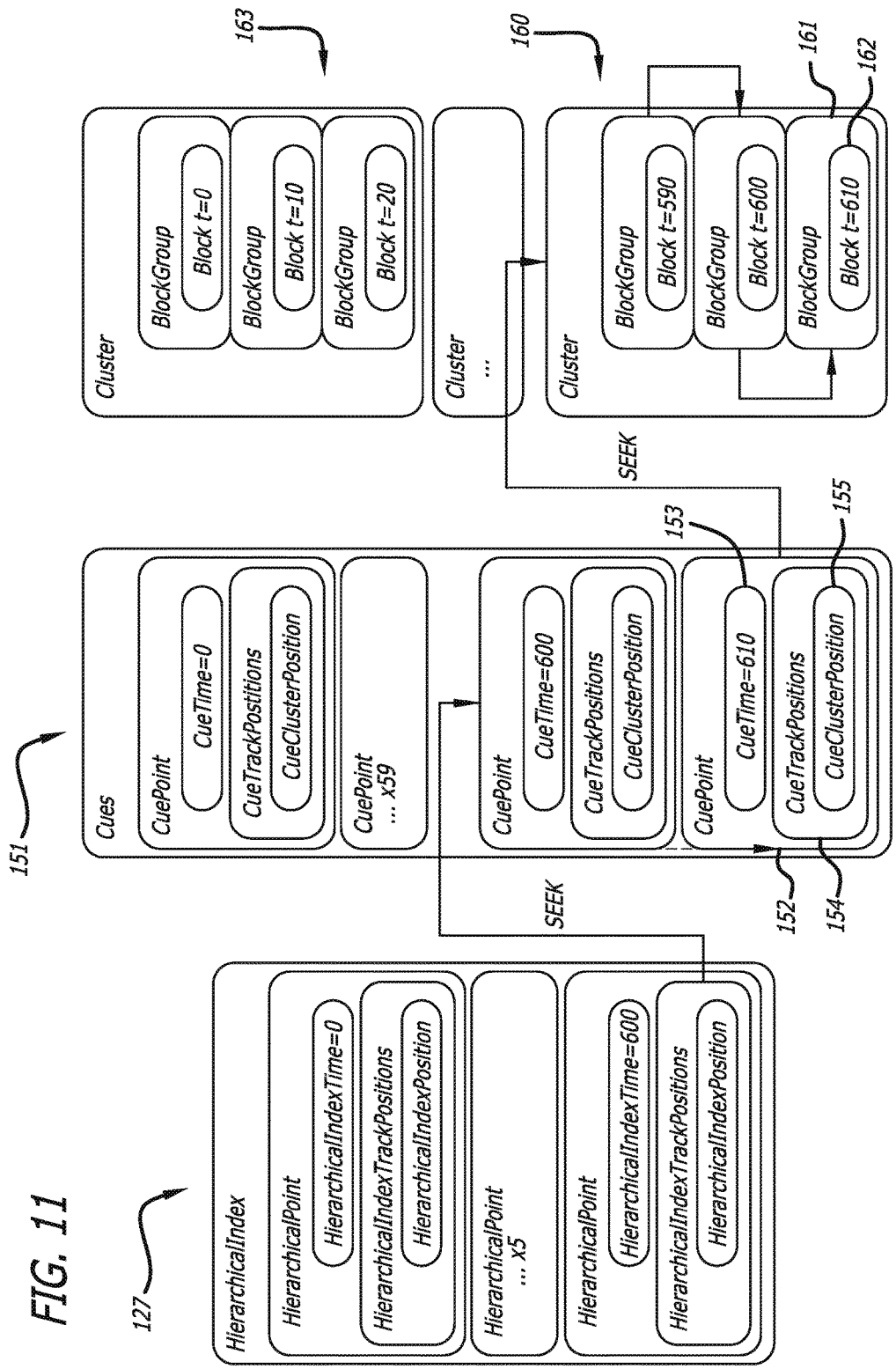

This concept is further clarified in FIG. 11. The Hierarchical Index time of 600 is identified from the Hierarchical Index structure 127 as previously described in reference to FIG. 10. In this particular example, the Index position within the Cues structure 151 is used to access the particular Cue Point 152 which corresponds to time 610 (Cue Time 153). The Cue Point 152 through data in Track Position 154 and Cluster Position 155 generally points to the Cluster structure 160 which may host several seconds' worth of multimedia data.

The multimedia data within a Cluster 160 may be stored as a Block Group 163, where individual Blocks of data corresponding to one or more access units of the elementary audio, video, subtitle, or other multimedia information exist. As such, Clusters contain block groups but can also contain only simple blocks. In the absence of a Block Group, it may be possible that a Cluster can host individual Blocks or a Simple Block. The corresponding Cluster Position 155 from the Cue Point 152 is used to locate the Cluster 160 and the desired Block 161 can be identified based on its time stamp (Block Time 162). In case where an exact time stamp is not matched, the Block with the closest time stamp can be identified.

The procedure for locating a Block according to a particular time may be repeated for multiple tracks of multimedia data such that all of the data in the corresponding Blocks are presented in a synchronized manner.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of decoding a media file for playing back by a playback device, comprising:
   a media file comprising a plurality of groups of frames, wherein each group of frames comprises a set of encoded video frames; and
   a hierarchical index comprising a top-level index indexing references to the plurality of group of frames, wherein each reference to a frame in the plurality of frames comprises a seek point referencing a location from which an individual frame of encoded video can be retrieved;
   requesting the hierarchical index;
   receiving a user request;
   selecting a seek point from the hierarchical index based on the user request;
   requesting at least one encoded video frame using the selected seek point from the selected subset of seek points by calculating an offset between the selected seek point and the nearest group of frames;

selecting a group of frames from the plurality of groups of frames using the hierarchical index and the calculated offset; and decoding at least one encoded video frame in the selected group of frames.

2. The method of claim 1, wherein the media file being a separate file from a file containing the hierarchical index.

3. The method of claim 1, wherein the media file contains the hierarchical index.

4. The method of claim 3, wherein the hierarchical index is stored as a set of distributed clusters within the multimedia file.

5. The method of claim 1, further comprising displaying a video frame on a display screen, the displayed video frame being a frame that corresponds to the decoded at least one encoded video frame.

6. The method of claim 1, wherein the user request further comprises a fast forward function for determining the subset of seek points, wherein the subset of seek points comprises a predetermined plurality of seek points.

7. The method of claim 1, wherein the hierarchical index further comprises metadata describing the data type for each frame of video within a group of frames.

8. The method of claim 1, wherein the set of frames in a group of frames is decoded in a decoding order.

* * * * *